United States Patent [19]

Kitamura et al.

[11] 4,380,779
[45] Apr. 19, 1983

[54] METHOD FOR RECORDING MULTIPLEXED SIGNALS ON METAL EVAPORATED TAPE

[75] Inventors: Sadafumi Kitamura, Neyagawa; Hiroshi Taniguchi, Hirakata, both of Japan

[73] Assignee: Matsushita Electric Industrial Co., Ltd., Osaka, Japan

[21] Appl. No.: 246,317

[22] Filed: Mar. 23, 1981

[30] Foreign Application Priority Data

Mar. 25, 1980 [JP] Japan ................... 55-38447

[51] Int. Cl.³ .............. H04N 9/491; H03F 1/00; H03G 3/20; H03G 5/16
[52] U.S. Cl. ................... 358/330; 360/66; 360/131; 360/134
[58] Field of Search ................... 360/17-21, 360/33, 66, 131-136; 358/4, 330

[56] References Cited

U.S. PATENT DOCUMENTS

| | | | |
|---|---|---|---|
| 2,734,941 | 2/1956 | Zenzel | 358/4 X |
| 2,892,017 | 6/1959 | Houghton | 358/4 |
| 3,864,729 | 2/1975 | Camras | 358/4 |
| 3,893,163 | 7/1975 | Wessels et al. | 358/4 |
| 4,172,171 | 10/1979 | Suzuki et al. | 360/134 |

FOREIGN PATENT DOCUMENTS 53-60605  5/1978  Japan ................... 360/131

*Primary Examiner*—Aristotelis M. Psitos
*Attorney, Agent, or Firm*—Wenderoth, Lind & Ponack

[57] ABSTRACT

A magnetic recording method for recording a multiplex signal having two different frequency signals. A magnetic recording medium is used having a magnetic layer with a thickness which is smaller than a recorded wavelength of each of said two signals. The signal of a higher frequency is recorded at a current which is more than 2dB larger than the lower limit of the recording current with which a reproduced output level is saturated, and which is smaller than a current with which the reproduced output level is reduced by 1dB beyond said saturated condition. The signal of a lower frequency is recorded at a current which is smaller than one half of that of the signal of a higher frequency.

6 Claims, 9 Drawing Figures

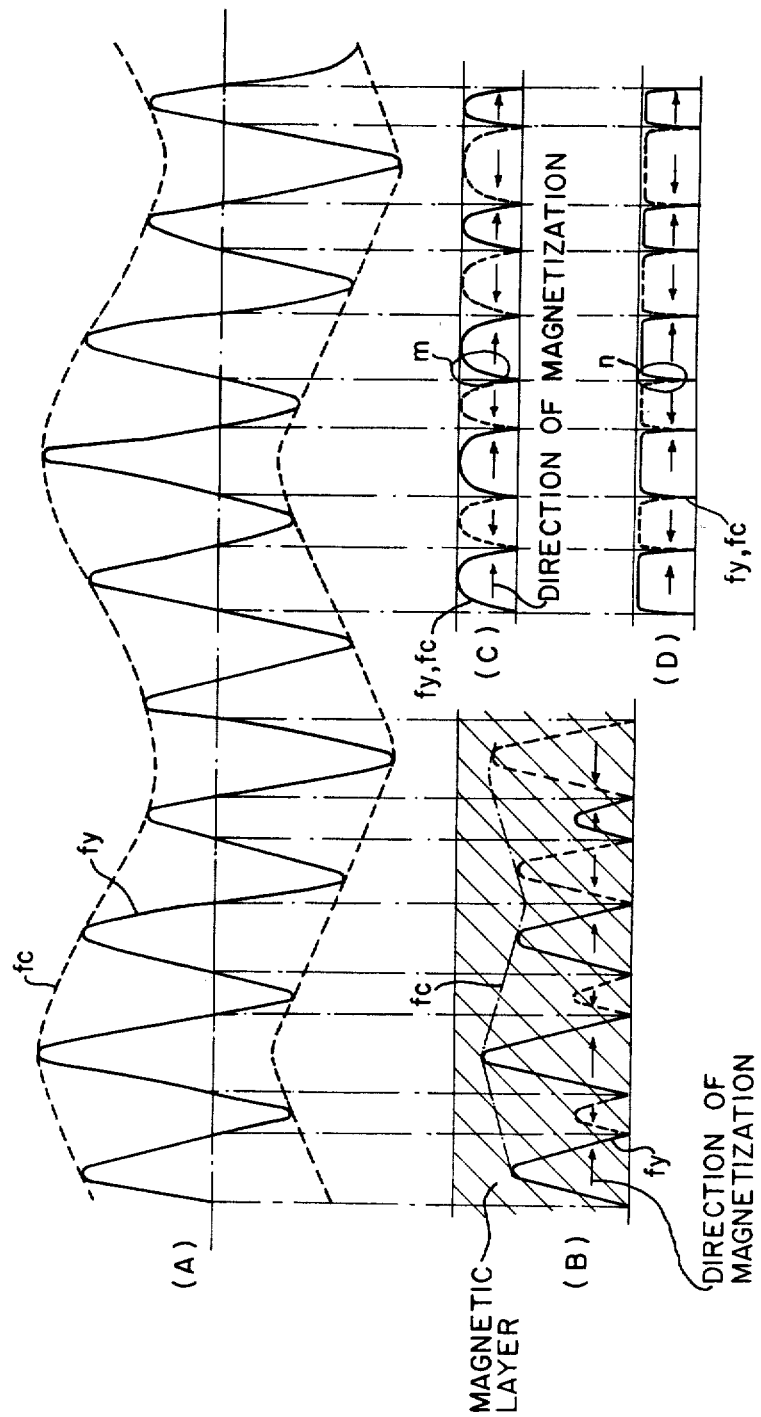

METHOD FOR RECORDING MULTIPLEXED SIGNALS ON METAL EVAPORATED TAPE

BACKGROUND OF THE INVENTION

This invention relates to a magnetic recording method, and more particularly relates to a method for recording two superimposed signals of different frequencies such as frequency modulated luminance signal and frequency converted chrominance signal in a color video signal recording system, and for optionally recording these two signals together with other signals.

Recently, magnetic video recording techniques have remarkably progressed with respect to increasing recording density. Shortwave and narrow trackwidth recording should be performed in order to increase the recording density. For this purpose, it is required that the influence of self-demagnetization in a shortwave range is reduced, for which it is effective to make the magnetic layer thinner and to increase the coercive force (Hc) thereof. A metal evaporated tape (hereinafter referred to as ME tape), plated tape, ion plated tape, etc., have been proposed as a recording medium having a thin magnetic layer of a large coercive force (Hc).

The ME tape has already partially been put into practical audio recording use. A magnetic layer of the ME tape is deposited onto a base by vacuum evaporation of Co, Fe, Cr, etc. Therefore, it is possible to form a magnetic layer which is 100% metal and having a thickness of between 100 Å and 3000 Å. The thickness for ordinary practical use is about 1000 Å.

On the other hand, the conventional coating-type magnetic tape (hereinafter referred to as a coating tape) has a magnetic layer comprised of a mixture of a magnetic material powder and a binder, and the content ratio of the magnetic material is about 30%. The thickness of the magnetic layer is about 5 μm. Thus, the magnetic layer of the ME tape is much thinner than that of the coating tape.

The ME tape of large Hc suitable for magnetic recording is obtained by performing vacuum evaporation with a device as shown in FIG. 1.

In FIG. 1, numerical designation 1 denotes a tape winder and designation 2 denotes a base film. A base film 3 is fed from the base film feeder 2 and is wound up onto the winder 2 after passing around a roller 4. The roller 4 is controlled in temperature and disposed thereunder is a crucible 5 containing a molten magnetic material such as Co. The vapor of the magnetic material melted at 1000° to 1500° C. flies as shown by arrows 6 from the crucible 5 and a part of it is shielded by a baffle plate 7, so that only a part of the vapor of a controlled projection angle θ is deposited on the base film 3. Coercive force Hc of the obtained magnetic tape is controlled by changing the location of the baffle plate 7, i.e. the projection angle θ of the vapor against the base film 3 on the roll 4.

The thus obtained ME tape has features such as a very thin magnetic layer, a superior dispersion of magnetic material, a high squareness of its B–H curve which is more than 90%, and a high coercive force.

Such an ME tape is advantageous for recording short wavelength signals for the following reasons:

Losses during electromagnetic transducing which occur relative to the recorded wavelength include a thickness loss and a self-demagnetization loss. Both the losses are relative to t/λ where t is a thickness of the magnetic layer and λ is a recorded wavelength. Therefore, the shorter the recorded wavelength is, or the thicker the magnetic layer is, the larger the losses become. As seen from this characteristic, those losses are especially significant in the short wavelength range. By using a tape having a thin magnetic layer such as the ME tape, those losses are considerably decreased.

Described below are problems to be considered when such an ME tape is used for magnetic recording and reproducing of a wideband signal such as that used in a color video tape recorder (VTR).

Generally in a home-use VTR, a color video signal is recorded in a multiplex signal state composed of a frequency modulated luminance signal and frequency converted chrominance signal whose frequency band is lower than that of the frequency modulated luminance signal. FIGS. 2A and 2B are basic block diagrams for performing the such recording method.

FIG. 2A is a block diagram of a recording system. From an input video signal supplied to a terminal 13 a luminance signal component is separated by a low-pass filter (LPF) 14 and a chrominance signal component is separated by a band-pass filter (BPF) 15. The luminance signal is frequency-modulated by an FM modulator 16. The chrominance signal is converted into a band which is lower than that of the frequency modulated luminance signal by a heterodyne frequency converter 18 with an output from a fixed oscillator (OSC) 17. The frequency modulated luminance signal and the frequency converted chrominance signal are then mixed by a mixer 19 and the mixed signals are amplified by a recording amplifier 20 to be recorded by a video head 21.

FIG. 2B is a block diagram of a reproduction system. A signal transduced by the video head 21 is amplified by a head amplifier 22 and the frequency modulated luminance signal is separated therefrom by a high-pass filter (HPF) 23 and the frequency converted chrominance signal is separated therefrom by a low-pass filter (LPF) 24. The frequency modulated luminance signal is demodulated by an FM demodulator 25 into the luminance signal. The frequency converted chrominance signal is converted into the original chrominance signal by a frequency converter 26 with an output of a variable oscillator 27. The variable oscillator 27 usually comprises an APC circuit or the like, and is operated to remove a phase distortion of the reproduced color burst signal. The thus reproduced luminance and chrominance signals are mixed by a mixer 28, so that the original color video signal is reproduced.

The spectra of the multiplex recording-signal in the NTSC system is shown in FIG. 3, in which the FM luminance signal is represented by 29 and the frequency converted chrominance signal by 30. The carrier frequency of the former is from 3.4 MHz to 4.4 MHz and that of the latter is 630 KHz. The recorded wavelength of these signals ranges from 1 to 60 m. Because of such a wide range of recorded wavelength, the multiplex signal of the frequency modulated luminance signal and the frequency converted chrominance signal (hereinafter referred to as $f_Y$ and $f_C$, respectively) should be recorded in specified conditions of recording current of each signal.

The method of determining such conditions in the conventional magnetic recording using the coating tape has been as follows:

FIG. 4 shows the characteristics fundamental to the determination of the current of the frequency modulated luminance signal $f_Y$. Referring to FIG. 4, curves $(f_Y)$, $(f_c)$ and (B) represent the relationships of reproduced $f_Y$ level, reproduced $f_c$ level and cross modulation level expressed by the ratio of reproduced level of the $(f_Y-2f_C)$ cross modulation component to that of $f_Y$, respectively, with respect to the recording current of $f_Y$, under the condition of fixing the mixing ratio of recording current of $f_C$ to that of $f_Y$. The $(f_Y-2f_C)$ component represents one of the components of cross modulation of $f_Y$ and $f_C$. The reason why this component is taken into consideration is as follows.

Generally, in a VTR, the electromagnetic transducing process of tape to head can be considered to be approximately equivalent to passing through a system having a 3rd order distortion present. When the two-frequency multiplex signal including $f_Y = A \sin \alpha$ and $f_C = B \sin \beta$ is applied to such system, the output component caused by the 3rd order distortion is represented as follows:

$$(A\sin\alpha + B\sin\beta)^3 = \left(\frac{3}{4} A^3 + \frac{3}{2} AB^2\right) \sin\alpha + \left(\frac{3}{4} B^3 + \frac{3}{2} A^2B\right) \sin\beta - \frac{1}{4} A^3\sin 3\alpha - \frac{1}{4} B^3\sin 3\beta - \frac{3}{4} AB^2\sin(\alpha \pm 2\beta) + \frac{3}{4} A^2B \cdot [\sin(2\alpha - \beta) - \sin(2\alpha + \beta)]$$

Among the distortion components in the above expression, the 3rd and 6th terms are removed due to the limitation of the transferable frequency band width of the reproduction system. The 1st, 2nd and 4th terms are negligibly small when compared with the fundamental signal components $f_Y$ and $f_C$. The 5th term which composes the $(f_Y \pm 2f_C)$ component, however, becomes noise of a frequency $2f_C$ after FM demodulation. This noise should be suppressed so as to be lower than the reproduced $f_Y$ level usually by more than 30 dB.

From the characteristics of FIG. 4, the recording current of $f_Y$ is determined. The optimum condition is obtained when it has the value at a point C in FIG. 4, at which the reproduced level of $f_Y$ becomes maximum.

FIG. 5 shows the characteristics which are used for determining a recording current of $f_c$. Referring to FIG. 5, curves $(f_Y)$, $(f_c)$ and (B) represent the relationship of the reproduced $f_Y$ level, the reproduced $f_c$ level and the cross modulation $$\frac{f_Y - 2f_c}{f_Y},$$

respectively, with respect to the recording current of $f_c$, under the condition of keeping the $f_Y$ current constant at the point C in FIG. 4. The drop of reproduced $f_Y$ level in the increased recording current range caused by an increased self-demagnetization due to an increase of the $f_c$ current.

In consideration of the decrease the reproduced $f_Y$ level and the increase of the cross modulation, the $f_c$ recording current is determined at a point D in FIG. 5.

The recording currents of $f_Y$ and $f_c$ in a VTR using a coating tape are thus determined and the usual ratio of the recording currents of $f_Y$ and $f_c$ is about 4:1.

On the other hand, in case where there is employed a magnetic recording medium having an extremely thin magnetic layer such as an ME tape, the characteristics of recording and reproducing are quite different from those in the case of conventional coating tape, so that abovementioned method cannot effectively be applied thereto.

SUMMARY OF THE INVENTION

It is an object of the present invention to provide a magnetic recording method for recording a two-frequency multiplex signal which is suitable for a system using a magnetic recording midium having a thin magnetic layer, whereby a higher reproduction signal output is obtained.

A magnetic recording method according to the present invention is characterized by:

using a magnetic recording medium having a magnetic layer which is thinner than the recorded wavelength of each of the multiplexed signals;

recording one of the multiplexed signals having a higher frequency than that of the other signal with a current which is more than 2 dB greater than the lower limit of the recording current with which a reproduced level thereof is saturated, and smaller than a current with which the reproduced level is reduced by 1 dB beyond said saturated condition; and recording said second signal with a current which is smaller than one-half of that of said first signal.

In addition to said signals which are the principal signals, one or more other signals may be recorded in a multiplex condition provided that such additional signals are suppressed in current levels so as not to substantially influence the reproduction of the two principal signals.

BRIEF DESCRIPTION OF THE DRAWINGS

FIG. 8 is a chart for explaining a magnetization according to a recorded signal in magnetic recording mediums.

DETAILED DESCRIPTION OF THE INVENTION

Figure 1:
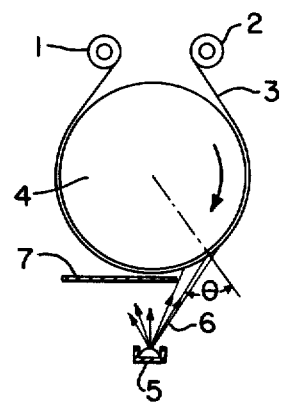
FIG. 1 is a sectional view of a deposition device used for an example of a method of making a metal evaporated tape (ME tape)
Figure 2A:
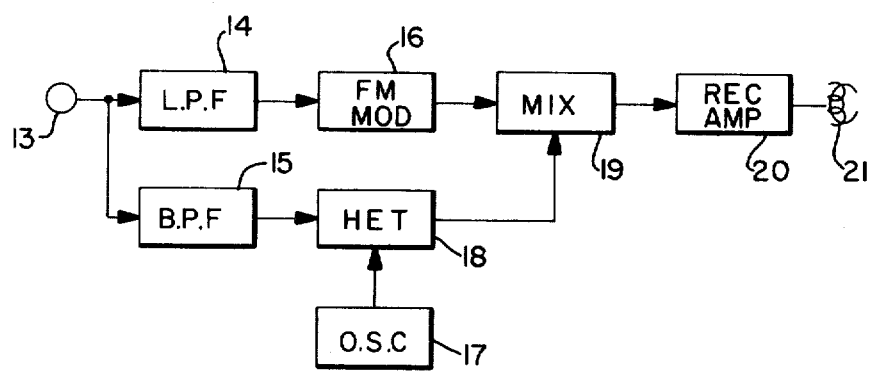
FIGS. 2A and 2B are block diagrams showing an example of magnetic recording and reproducing system for a video signal.
Figure 2B:
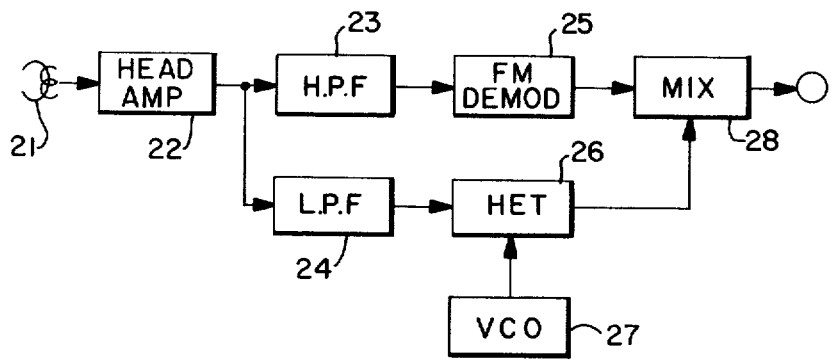
Figure 3:
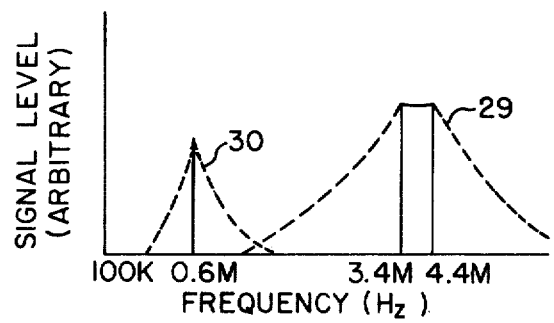
FIG. 3 is a graph showing a spectrum of a recording signal in a video tape recorder (VTR) of NTSC system.
Figure 4:
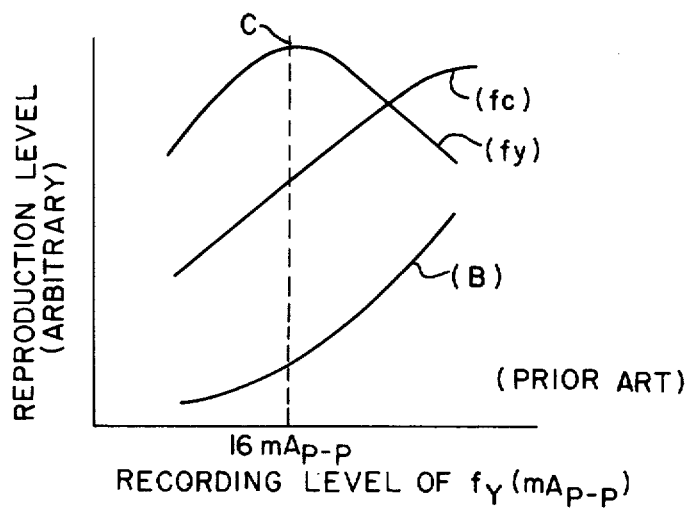
FIGS. 4 and 5 are graphs showing electromagnetic transducing characteristics of a coating tape in a VTR.
Figure 6:
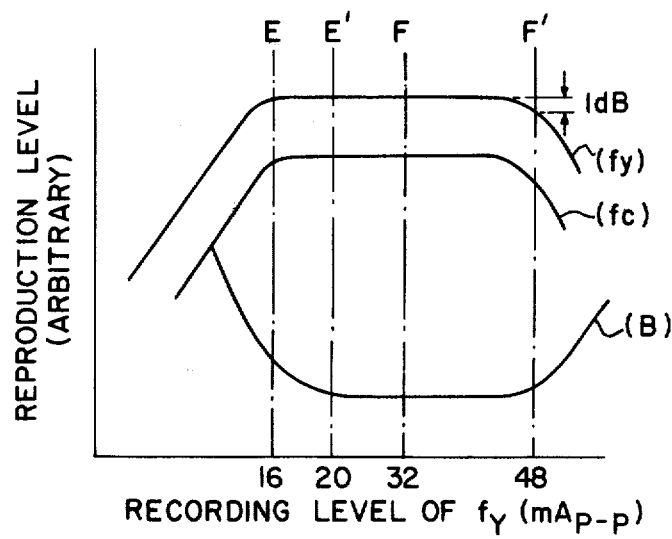
FIGS. 6 and 7 are graphs showing electromagnetic transducing characteristics of the ME tape in a VTR for explaning the present invention.
Figure 7:
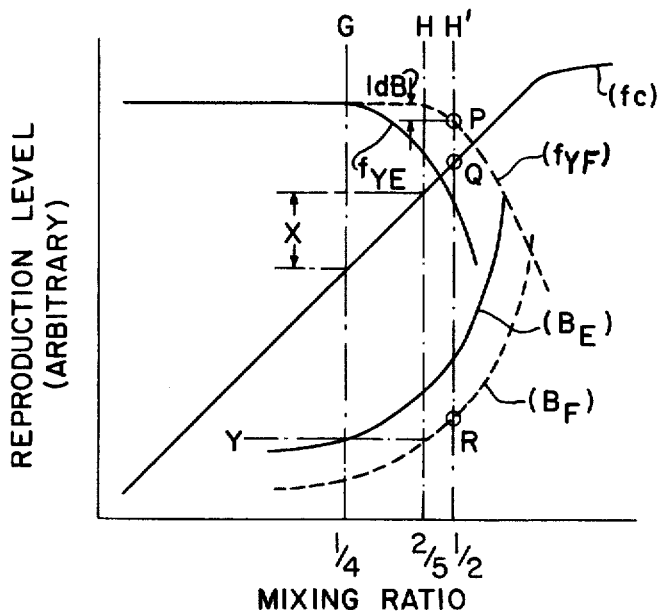

FIGS. 6 and 7 are graphs showing the electromagnetic transducing characteristics of the ME tape in the case of the multiplex recording of the frequency modulated luminance signal $f_Y$ and the frequency converted chrominance signal $f_C$. FIG. 6 shows characteristics which are similar to that of FIG. 4 in the conventional method. In this figure, curves $(f_Y)$, $(f_C)$ and (B) represent the relationship of the reproduced level of $f_Y$, that of $f_C$ and cross modulation $$\frac{f_Y - 2f_C}{f_Y},$$

respectively, with a recording current of $f_Y$, under the condition of a constant mixing ratio of the recording current of $f_C$ to that of $f_Y$ at (2/5). As seen from FIG. 6, the reproduction levels of $f_Y$ and $f_C$ are saturated with an $f_Y$ recording current of a certain value, and are kept in the saturation region with an $f_Y$ recording current up to another certain value, and are reduced from the saturation level with the $f_Y$ recording current exceeding a certain higher value. In a lower range of the $f_Y$ recording current, the cross modulation level is decreased with an increase of the $f_Y$ recording current, and it is kept constant with the $f_Y$ recording current above a certain value. It begins to increase with the $f_Y$ recording current exceeding another certain value. From these characteristics, it is seen that if the $f_Y$ recording current is in the range in which the reproduction levels of $f_Y$ and $f_C$ are in saturation, the cross modulation level exhibits a fairly low value, so that the electromagnetic transducing is performed in an advantageous condition.

FIG. 7 shows the electromagnetic transducing characteristics when the recording current of $f_C$ is changed, with the $f_Y$ recording current being kept at constant values, i.e., values represented by points E and F in FIG. 6. The point E represents the value with which the saturation of the reproduction level begins, and the point F represents a value which is larger than that of the point E by 6 dB. The abscissa of FIG. 7 is expressed by the ratio of the recording current of $f_C$ to that of $f_Y$ (hereinafter referred to as the mixing ratio), for the sake of easiness of comparison of the two cases. Curves ($f_{YE}$) and ($f_{YF}$) represent the relationship between the reproduced $f_Y$ level and the mixing ratio, and curves ($B_E$) and ($B_F$) represent the relationship between the cross modulation level and the mixing ratio. The solid line curves ($f_{YE}$) and ($B_E$) correspond to the case where the $f_Y$ recording current has the value at the point E, and the dotted line curves ($f_{YF}$) and ($B_F$) correspond to the case where the $f_Y$ recording current has the value at the point F. A curve ($f_C$) represents the relationship between the reproduced $f_C$ level and the mixing ratio at both the points E and F in FIG. 6.

Points G and H in FIG. 7 represent values of the mixing ratio at which the reproduced $f_Y$ level begins to decrease, corresponding to each case of the operating value of the $f_Y$ recording current. At these two points G and H, the reproduced $f_Y$ levels are nearly equal to each other, the cross modulations are nearly at the same level represented by Y, and the reproduced $f_C$ level at the point H is higher than that at the point G by a difference X. Namely, if $f_Y$ is recorded at the current of the point F and the mixing ratio is set at the value of the point H, a high reproduced $f_C$ level is obtained.

Thus, the characteristic curve of the reproduced $f_Y$ level such as that shown in FIG. 7 varies in accordance with the $f_Y$ recording current. However, at the $f_Y$ recording current above the value of a point E' in FIG. 6, such the characteristic curve does not vary and is similar to that represented by the curve ($f_{YF}$) in FIG. 7. The point E' represents an $f_Y$ recording current which is 2 dB larger than that with which the reproduced $f_Y$ level reaches the saturation level in FIG. 6. This $f_Y$ recording current at the point E' coincides with above-mentioned certain value above which the cross modulation is kept at a low constant level.

It is not practical for the $f_Y$ recording current to be above the value of a point F' in FIG. 6 with which the reproduced $f_Y$ level is reduced from the saturation level thereof by 1 dB, because of the decrease of the reproduced $f_Y$ level and increased cross modulation. The optimum characteristic represented by the curve ($f_{YF}$) in FIG. 7 is maintained with the $f_Y$ recording current up to the value of the point F' in FIG. 6.

The above-mentioned relationship between the characteristic curves ($f_Y$), ($f_C$) and (B) are also obtained under the conditions of various mixing ratio from 1/5 to ½, though the reproduced level of ($f_C$) and (B) are varied.

Thus, the $f_Y$ recording current should be in the range between the points E' and F' in FIG. 6. The interval between the currents at the points E' and F' varies in accordance with the recorded wavelength of $f_Y$. It was, for example, about 10 dB when a signal with the recorded wavelength of 1 μm was recorded on an ME tape having a magnetic layer of Co with a thickness of 1000 Å and an Hc of 1000 Oe.

The mixing ratio of the recording current of $f_C$ to that of $f_Y$ is determined as follows:

The lower limit of the mixing ratio is determined in consideration of the S/N required for the system, and generally, the practical lower limit is 1/5.

The upper limit of the mixing ratio is preferably 2/5 which is the optimum value represented by the point H in FIG. 7, but in practice, it may be ½ as represented by a point H' in FIG. 7 at which the reproduced $f_Y$ level is reduced by 1 dB from the maximum level. A mixing ratio more than ½ is not practical because of an abrupt decrease of the reproduced $f_Y$ level and an abrupt increase of the cross modulation products.

Although the characteristics curves of FIGS. 6 and 7 are data for the case where $f_Y$ has the recorded wavelength of 1 μm and an $f_C$ of 10 μm, similar results were obtained in the range of a recorded wavelength of $f_Y$ from 0.5 μm to 3 μm and an $f_C$ of from 5 μm to 20 μm which is the range where a usual VTR is operated.

As described above, the recording current range from E' to F' is suitable in consideration of the characteristics of the reproduced signals $f_Y$, $f_C$ and cross modulation level B in FIG. 6. In such a range, it is possible to select the recording current level of ($f_C$) which is higher than that of point E by X dB at the maximum without causing a decrease in the reproduction level of ($f_Y$). Therefore, a higher S/N is obtained in such a current range.

The above-mentioned electromagnetic characteristics are due to the following phenomenon.

A chart (A) in FIG. 8 shows a wave form of a multiplex signal of $f_Y$ and $f_C$. A chart (B) shows a magnetization in a magnetic layer of a coating tape by the recording signal of the chart (A). As seen from this chart, the modulation of $f_Y$ by $f_C$ appears as a variation of magnetization in the direction of the thickness of the magnetic layer. The information concerning $f_C$ is recorded as an intensity change of magnetization by the $f_C$ recording signal. The magnetization direction is ordinarily parallel to the tape surface, but if a large recording current of $f_Y$ flows, it is changed, so that self-demagnetization occurs, causing the reproduced $f_Y$ level to be decreased. At the same time, the recording demagnetization also acts to reduce the reproduced $f_Y$ level.

Charts (C) and (D) show magnetizations in an ME tape, by a small recording current and a sufficiently large recording current, respectively. In the case of an ME tape, the saturation as shown in FIG. 6 occurs with the large recording current, because the recording is performed by a region of sharp magnetic field of a magnetic head and it is difficult for the recording demagnetization to occur due to the thinness of the magnetic layer. Therefore, the information concerning $f_C$ is recorded as a change of the width ratio (duty cycle) of pulses representing $f_Y$, rather than a change of the magnetization intensity. Under the recording condition according to the present invention, electromagnetic transducing is operated in the saturation range such as that represented by the curve ($f_{YF}$) in FIG. 7, so that $f_C$ is recorded as the duty cycle change of $f_Y$, whereby the reproduced $f_Y$ level hardly decreases even if the mixing ratio is changed. Furthermore, the cross modulation is reduced by operating the recording in the saturation range. The reason is that $f_C$ is included in the leading and trailing edges of recorded $f_Y$ signal and the transducing of the leading and trailing edges is superior in linearity when the recording current is large such as a portion n of the chart (D) rather than when the recording current is small such as a portion m of the chart (C).

By recording a video signal on the ME tape as mentioned above, it is possible to increase the mixing ratio of the chrominance signal with respect to the conventional method, so as to improve the S/N of the reproduced chrominance signal, because of an increased reproduction output. Furthermore, it is possible to set the mixing ratio so as to be in the range of low cross modulation. Furthermore, since the recording is operated in the range where the reproduced level is fully saturated, the reproduction output does not significantly fluctuate, even if the recording current varies somewhat.

The following is a comparison of specific examples of the method according to the present invention and the conventional method.

In an example of the conventional method, there was employed a coating tape having a magnetic layer with a thickness of 5 μm and an Hc of 650 Oe and containing a magnetic material of $\gamma$-Fe$_2$O$_3$ with Co.

In an example of the present invention, there was employed an ME tape having a magnetic layer made of 100% Co or Co combined with 20 to 30% Ni with a thickness of 1000 Å and an Hc of 1000 Oe.

Measurements were performed under the condition that the recorded wavelength of $f_Y$ is 1 μm, that of $f_C$ was 10 μm and a magnetic head with a track width of 20 μm, a gap length of 0.3 μm and a winding of 17 turns was used.

In the example of the conventional method, the optimum recording current of $f_Y$ (which corresponds to the value at the point C in FIG. 4) was 16 mA$_{p-p}$, the optimum recording current of $f_C$ (the value at the point D in FIG. 5) 4 mA$_{p-p}$, and the cross modulation −30 dB.

In the present example of the invention, the $f_Y$ recording current at which the saturation of the reproduced $f_Y$ level begins (the value at the point E in FIG. 6) was 16 mA$_{p-p}$, and the $f_Y$ recording current with which the reproduced $f_Y$ level was reduced by 1 dB (the value at the point F' in FIG. 6) was 48 mA$_{p-p}$. When the $f_Y$ was recorded at 32 mA$_{p-p}$ so that the characteristic of the curve ($f_{YF}$) in FIG. 7 was obtained, the optimum $f_C$ recording current corresponding to the point H in FIG. 7 was about 13 mA$_{p-p}$, in which the cross modulation was −30 dB.

Figure 5:
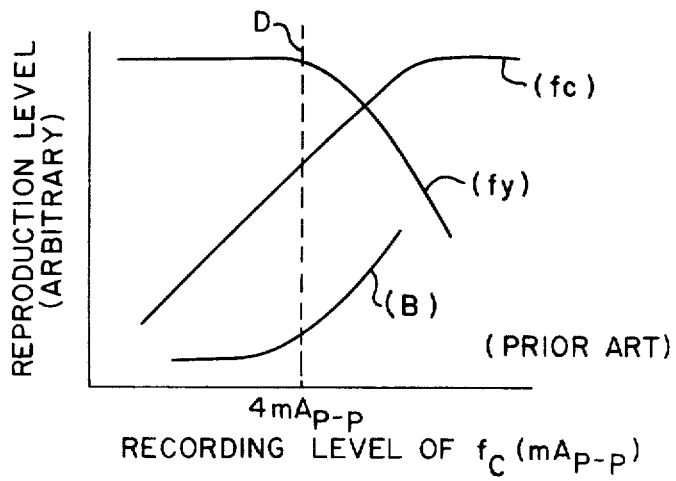

The reproduced $f_C$ level at the point G in FIG. 7 ($f_Y$ recording current = 16 mA) was approximately equal to that at the point D in FIG. 5. The difference between the reproduced $f_C$ levels at the point H and G in FIG. 7 was 3 dB. Thus, the reproduced $f_C$ level at the optimum condition according to the present invention was higher by 3 dB than that at the optimum condition according to the conventional method using the coating tape.

The reproduced $f_Y$ level in the case of the ME tape was higher than that in the case of the coating tape by 10 to 15 dB.

The characteristics as mentioned above were also obtained with the ME tape in which the magnetic layer was made of a principal component of Co and 15% or so of an additive such as Ni or Cr and had the thickness from 500 Å to 2000 Å. Furthermore, Fe may be used as a principal component. Approximately the same characteristics are also obtained with a metal plated tape or an ion plating tape which has a fairly thin magnetic layer. The characteristics as mentioned above are obtained under the condition that the magnetic layer of a recording medium has the thickness which is smaller than the recorded wavelength of each signal of superimposed signals, and so the present invention is applicable only when such a condition is satisfied.

Although the invention is described in two signal recording, it is applicable to more-than-three signal recording provided that signals other than two principal signals are recorded at a magnitude small enough not to substantially affect the transducing of the two principal signals. For example, a frequency modulated audio signal or pilot signal may be recorded in addition to the principal signals of the luminance signal and chrominance signal.

What is claimed is:

1. A magnetic recording method for recording a multiplex signal comprising two principal signals, comprising the steps of:
   using a magnetic recording medium having a magnetic layer with the thickness which is smaller than a recorded wavelength of each of said two principal signals;
   recording one of said principal signals having a higher frequency than that of the other signal at a current which is more than 2 dB greater than the lower limit of the recording current with which a reproduced output level is saturated, and which is smaller than a current with which the reproduced output level is reduced by 1 dB beyond said saturated condition; and
   recording said other principal signal of a lower frequency at a current which is smaller than one half of that of said signal of a higher frequency.

2. A magnetic recording method as claimed in claim 1, in which said multiplex signal comprises a frequency modulated luminance signal and a frequency converted chrominance signal in a color video signal recording system.

3. A magnetic recording method as claimed in claim 1, in which one or more additional signals other than said two principal signals are recorded in a multiplexed condition at a magnitude which is small enough not to substantially affect the transducing of said two principal signals.

4. A magnetic recording method as claimed in claim 1, in which said signal of a higher frequency is recorded at a current which is smaller than the upper limit of the recording current with which the reproduced output level is saturated.

5. A magnetic recording method as claimed in claim 1, in which said signal of a lower frequency is recorded at a current which is smaller than two-fifths of that of said signal of a higher frequency.

6. A magnetic recording method as claimed in claim 1, in which the magnetic layer of the magnetic recording medium comprises a vacuum-evaporated metal layer.

* * * * *